(12) United States Patent
Koci

(10) Patent No.: US 8,123,412 B2
(45) Date of Patent: Feb. 28, 2012

(54) VACUUM PUMP WITH A BEARING CAGE HAVING A THREADED GROOVE

(75) Inventor: Bernd Koci, Schoeffengrund (DE)

(73) Assignee: Pfeiffer Vacuum GmbH, Asslar (DE)

( * ) Notice: Subject to any disclaimer, the term of this patent is extended or adjusted under 35 U.S.C. 154(b) by 835 days.

(21) Appl. No.: 12/077,818

(22) Filed: Mar. 20, 2008

(65) Prior Publication Data

US 2008/0232985 A1    Sep. 25, 2008

(30) Foreign Application Priority Data

Mar. 23, 2007 (DE) .......................... 10 2007 014 142

(51) Int. Cl.
*F16C 19/00* (2006.01)
*F16C 33/38* (2006.01)
(52) U.S. Cl. ........................................ 384/470; 384/523
(58) Field of Classification Search .................. 384/462, 384/465, 470, 472, 489, 512, 523, 527, 531, 384/572; 417/423.12, 423.13, 423.4
See application file for complete search history.

(56) References Cited

U.S. PATENT DOCUMENTS

| | | | | |
|---|---|---|---|---|
| 4,915,515 A | * | 4/1990 | Rohrer et al. | 384/465 |
| 5,851,313 A | * | 12/1998 | Milam | 148/222 |
| 6,406,189 B1 | * | 6/2002 | Boutreux et al. | 384/527 |
| 2008/0112660 A1 | | 5/2008 | Koch | |

FOREIGN PATENT DOCUMENTS

WO    WO2006131694    * 12/2006

* cited by examiner

*Primary Examiner* — James Pilkington
(74) *Attorney, Agent, or Firm* — Abelman, Frayne & Schwab

(57) ABSTRACT

A vacuum pump includes a high-speed rotor, and an anti-friction bearing for rotatably supporting the rotor and including an inner ring, an outer ring, a rolling body, and a cage for the rolling body both the rolling body and the cage being located in an intermediate space defined by the outer and inner rings, with the cage having a threaded groove in a section of its surface adjacent to the inner ring for insuring a continuous feeding of a lubricant to the bearing.

9 Claims, 5 Drawing Sheets

VACUUM PUMP WITH A BEARING CAGE HAVING A THREADED GROOVE

BACKGROUND OF THE INVENTION

1. Field of the Invention

The present invention relates to a vacuum pump having a high-speed rotor, and an anti-friction bearing for rotatably supporting the rotor and including an inner ring, an outer ring, a rolling body, and a cage for the rolling body both the rolling body and the cage being located in an intermediate space defined by the outer and inner rings.

2. Description of the Prior Art

For many years, vacuum pumps with a high-speed rotor have successfully been used for producing vacuum with a low absolute gas pressure. Vacuum pumps of turbomolecular or Holweck types have been used with a particular success. For rotatably supporting the rotor, as a rule, magnetic or anti-friction bearings are used. Despite a great progress in reduction of manufacturing costs of magnetic bearings, the use of anti-friction bearings as operational bearings in vacuum pumps still cannot be eliminated.

Anti-friction bearings require lubrication in order to achieve as long as possible service life. The supply of lubricant in anti-friction bearings can be divided in two categories.

To the first category, grease-lubricated bearings belong. In the grease-lubricated bearings, lubricant is embedded in a matrix, with a small amount of the lubricant being fed therefrom. The problem with this category of bearings consists in that in the majority of cases, the grease can be replaced only with great costs and therefore a vacuum pump must be produced with a certain amount of grease already being put into the vacuum pump during production. This is associated with certain drawbacks such as, e.g., reduction in the rotor temperature that can be achieved. This is because the rotor heat is essentially removed by the anti-friction bearing, leading to the heating of the lubricant. Because the grease always remains in the bearing, there is a danger that it would be destroyed by high temperature.

To the second category belong anti-friction bearings through which lubricant flows. A lubricant flow can be produced by a lubricant pump when a large amount of the lubricant is required, or obtained by capillary forces at small amounts of lubricant. Such a bearing support is disclosed in German Publication de 10 2006 053 237.

Though the service life of vacuum pumps with the anti-friction bearings of the second category is greater than with those of the first category, wear was noticed that was greater than expected.

Accordingly, an object of the present invention is to increase the service life of a vacuum pump with a high-speed rotor supported by at least one anti-friction bearing.

SUMMARY OF THE INVENTION

These and other objects of the present invention, which will become apparent hereinafter, are achieved by providing a vacuum pump of the type described above and in which the cage has a threaded groove in a section of its surface adjacent to the inner ring for insuring a continuous feeding of a lubricant to the bearing.

The tread groove provides for a uniform lubricant delivery between the inner ring and the cage and into the bearing interior. Thereby, there is no direct mechanical contact between the cage and the inner ring. As a result, the service life of the anti-friction bearing and, thereby, of the vacuum pump are noticeably increased.

Advantageously, the anti-friction bearing is formed as a grooved ball bearing. Vacuum pumps should be capable of being driven, if possible, in different installation positions. To this end, grooved ball bearings are advantageous as they are capable of transmitting an axial load, which is applied to the inner ring, in both axial directions.

According to a further advantageous embodiment of the present invention, the thread has a plurality of flights distributed over the cage circumference. This provides for a uniform delivery of the lubricant and formation of the lubricant film over the cage circumference.

A further modification relates to the cage itself. According to this modification, the cage has a conical structure an inner surface of which adjoins a section of the cage with a threaded groove. This improves the lubricant flow toward the threaded groove and, thus, contributes to the increase of the service life of the bearing.

A further modification relates to retention of the anti-friction bearing in the vacuum pump. The anti-friction bearing should be vibratingly supported so that vibrations, which are produced by rotor unbalance, are not transmitted directly to the vacuum pump housing. Without vibrational support of the anti-friction bearing, the rotor vibrations can lead to damage of the bearing. The vibrational support means includes flange discs which increase the bearing surface of compressible axial retaining means that can be formed, e.g., as elastomeric rings.

According to an advantageous embodiment of the present invention, at least one of the flange discs is formed integrally, as one piece, with the outer ring. This prevents movement of the flange disc and the outer ring relative to each other. The relative movement of the flange disc and the outer ring to each other leads to abrasion of material which, in turn, would lead to contamination of the lubricant. The contamination of the lubricant reduces the service life of the bearing.

According to still further advantageous embodiment of the present invention, the material of the anti-friction bearing is a nitrogen-alloyed martensite steel. Bearings, which are formed of this material, proved to be particularly very wear- and corrosion-resistant in the region of the bearing race. Thereby, the service life of the bearing is increased even further.

The foregoing modification can be economically carried out when a material of the anti-friction bearing includes nitrogen-alloyed martensite steel in an edge layer that borders the surface of the inner ring or includes the same. Thereby, instead of a high-alloyed finished material, a more convenient basic steel is used which subsequently is hardened by treatment in a nitrogen atmosphere.

The foregoing advantages become particularly noticeable when a vacuum pump is formed as a turbomolecular pump. Contrary to other vacuum pumps, in the turbomolecular pump, the speed and, thereby, the load, which act on the bearing, is particularly high, but the amount of lubricant can be as small as possible.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS

The drawings show:

FIG. 4a a cross-sectional view of the inner ring of the bearing of the inventive bearing arrangement;

FIG. 4b a diagram illustrating quantitative content of nitrogen along line A in FIG. 4a.

DETAILED DESCRIPTION OF THE PREFERRED EMBODIMENTS

Figure 1:
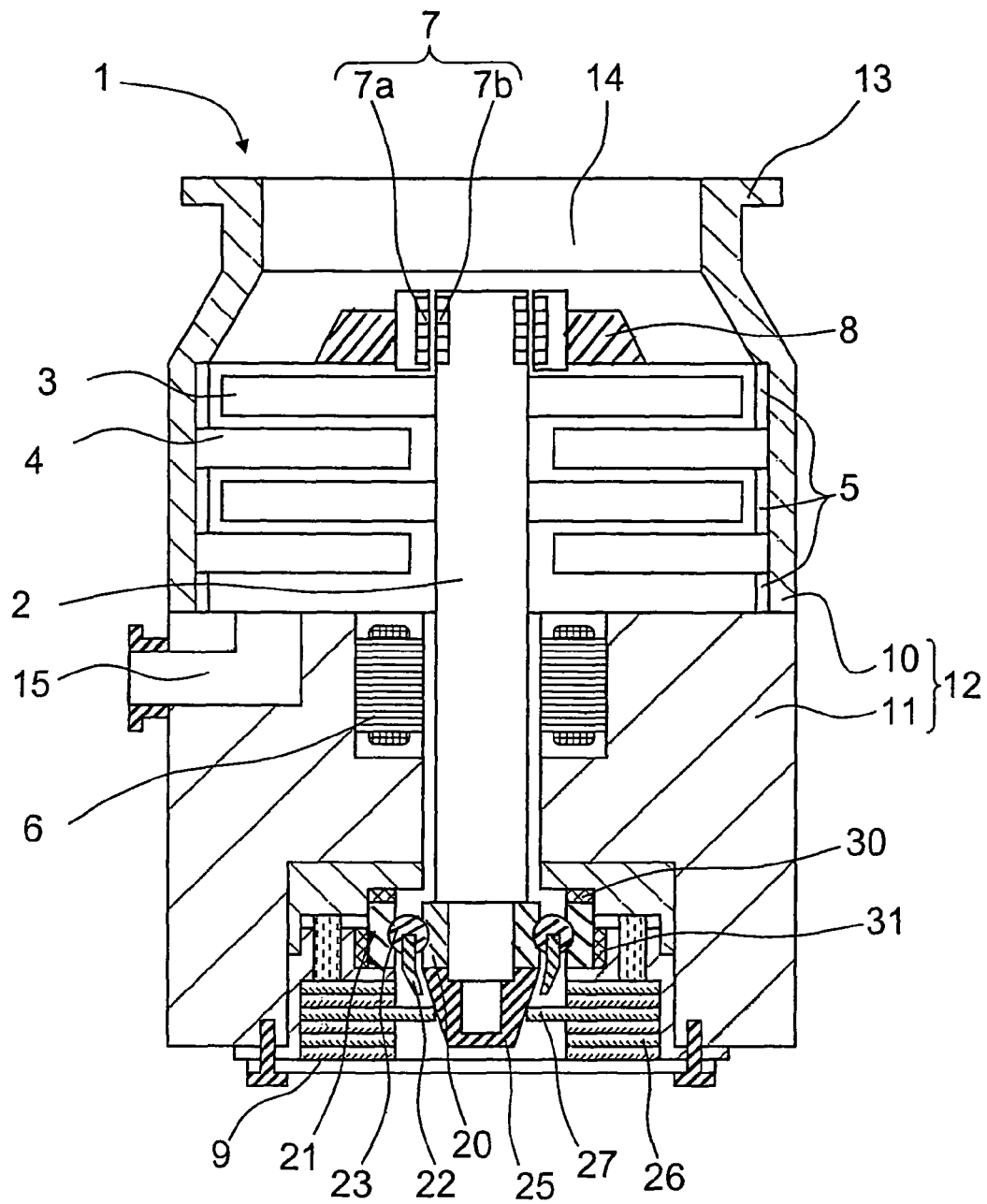
FIG. 1 a cross-sectional view of a vacuum pump with a bearing arrangement according to the present invention.

FIG. 1 shows a cross-sectional view of a turbomolecular pump 1 that will be referred further below simply as turbo pump. The turbo pump 1 has a housing 12 formed of an upper housing part 10 containing the pumping system, and a lower housing part 11 in which, among others, a drive 6 is located. The drive 6 rotates a shaft 2 with a high speed that for gas friction pumps and, in particular, for turbo pumps lies in a range of several tens of thousand revolutions per minute. On the shaft 2, blade-carrying rotor discs 3 are secured. The rotor discs 3 are mounted on the shaft 2 at a distance from each other. In the formed spaces, stator discs 4, which likewise carry blades, are located. The stator discs 4 are axially spaced from each other by spacing rings 5 and are centered by the upper part 10 of the housing 12. The housing 12 further includes a gas inlet-surrounding flange 13 for releasably connecting the turbo pump 1 with a recipient. The gas that enters the gas inlet 14, flows through the rotor and stator discs 3 and 4, and is expelled through the gas outlet 15. There is further provided a bearing holder 8 for housing a bearing that rotationally supports the shaft 2. This bearing has permanent magnets which are provided in oppositely located bearing stator 7a and bearing rotor 7b. Thereby, a permanent magnetic bearing 7 is formed that generates a force along a shaft axis dependent on a spacial position of the turbo pump 1. The shaft axis defines a direction that will be referred further as an axial direction. The radial direction is defined as a direction that extends perpendicular to the axial direction. The forces produced by the permanent magnetic bearing 7 can be directed with respect to the flange 13 as follows: upward or away from it, downward.

At the end of the shaft 2 remote from the flange 13, a lower end, there is provided a second bearing arrangement with a anti-friction bearing. The bearing arrangement includes an inner ring 20, an outer ring 21, a cage 22 and, as a rule, a plurality of rolling bodies 23. A so-called spray nut 25 secures the inner ring 20 of the anti-friction bearing on the shaft 2. The spray nut 25 has a conical outer surface a diameter of which increases in a direction of the anti-friction bearing. At a rapid rotation of the shaft, lubricant, which finds itself on the surface of the spray nut, is fed in the direction of the bearing. The lubricant reaches the surface of the spray nut, in the embodiment shown in the drawings, over nose-shaped structures 27 from a lubricant store 26. For large amounts of lubricant, the lubricant store can be replaced with a reservoir and a lubricant delivery pump. The outer ring 21 of the anti-friction bearing is vibrationally retained by an upper axial vibration ring 30 in an axial direction and by a radial vibration ring 31 in a radial direction. The bearing region is closed vacuum-tight by a cover 9.

Figure 2:
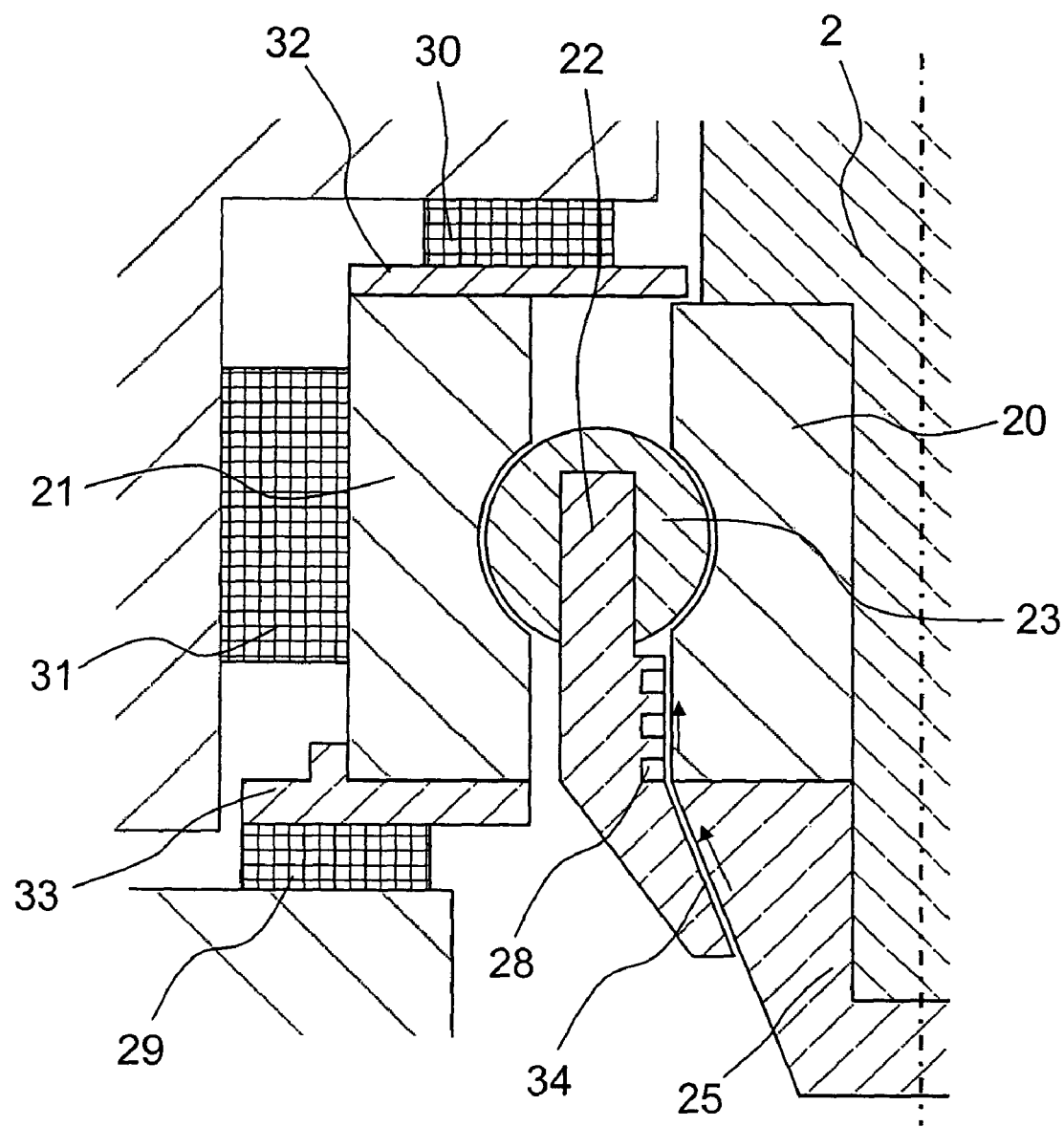
FIG. 2 a cross-sectional view of the inventive bearing arrangement.

The anti-friction bearing is shown in detail in FIG. 2. The plurality of rolling bodies 23 are arranged between the inner ring 20, which is secured on the shaft 2 with a spray nut 25, and the outer ring 21. The plurality of rolling bodies 23 are distributed over the circumference at a distance from each other by the cage 22. A section of the surface of the cage 22 is located adjacent to the inner ring 20. This section is provided with a threaded groove 28, with the thread circumscribing the inner surface of the cage 22 along its circumference. The direction of the helice is so selected that upon rotation of the cage 22, the lubricant is fed in direction shown with arrows. The cage 22 has a cone 34 that provides for feeding the lubricant in the direction shown with the arrows. The lubricant is fed along an inner cone surface toward the threaded groove 28 by centrifugal forces. At an end side of the outer ring 21 remote from the groove 28, there is provided a flange disc 32.

Figure 5:
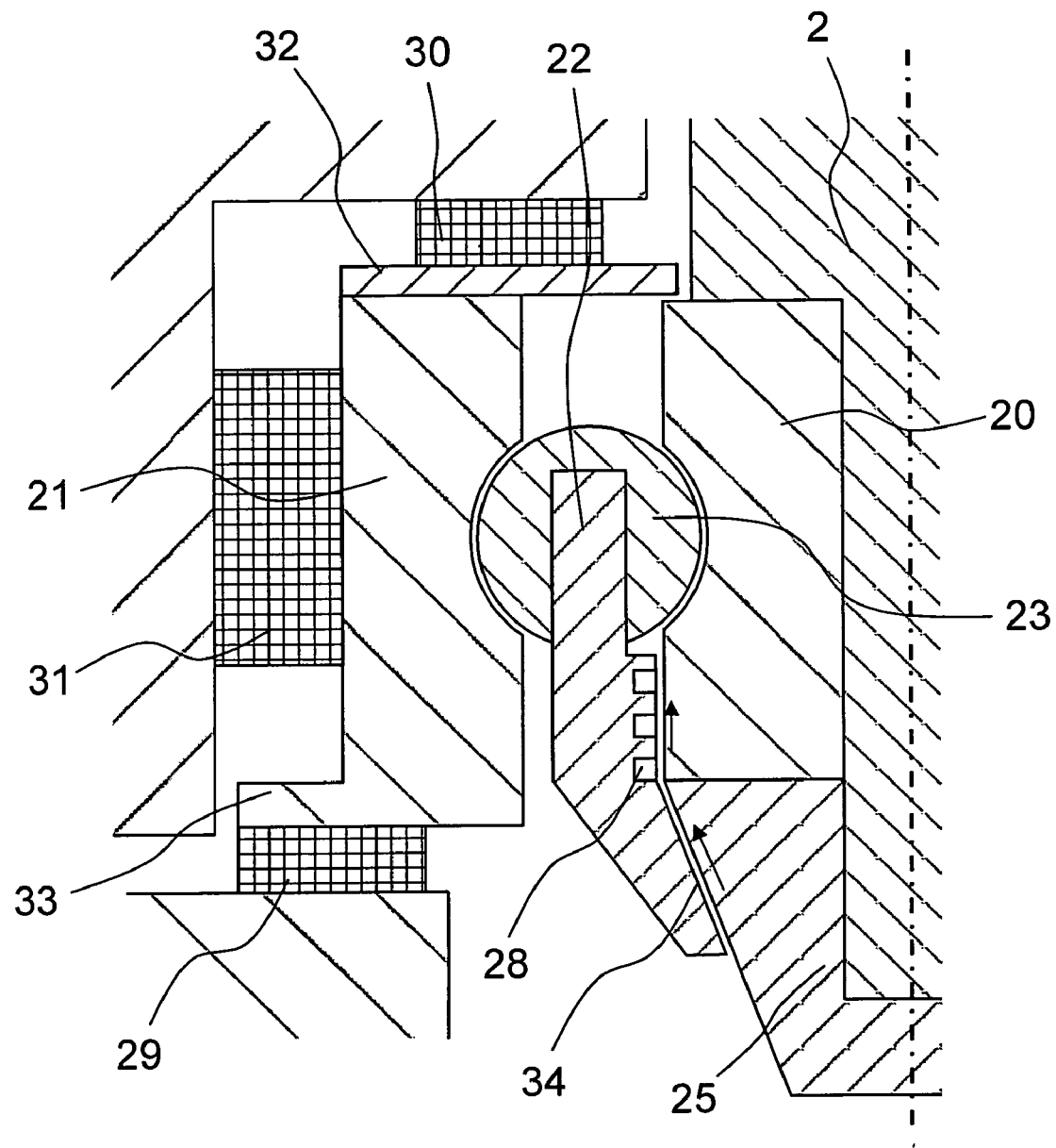
FIG. 5 a cross-sectional view of a modified embodiment of the inventive bearing arrangement.

The flange discs 32 and 33 can loosely contact the outer ring 21 and be formed separately from the outer ring 21. According to a modified embodiment of the inventive bearing arrangement shown in FIG. 5, at least of the flange discs 32, 33 can be formed as one piece with the outer ring 21. Preferably, both flange discs, 32, 33 are formed as one piece with the outer ring 21. This prevents a relative movement of the flange discs 32, 33 and the outer ring 21 in case of a radial displacement of the outer ring 21. The relative movement between the flange discs and the outer ring can cause abrasion of material and, thereby, contamination of the lubricant. The contamination of the lubricant can lead to destruction of the bearing and, consequently, of the turbo pump. The first axial vibration ring 30 is arranged between the upper flange disc 32 and the pump housing. A second axial vibration ring 29 is arranged between the lower flange disc 33 and the housing. The radial vibration ring 30 is provided between the outer ring 21 and the housing. Thereby, in summary, the outer ring 21 is vibrationally supported in all of the spatial directions. This prevents transmission of the vibrations of the rotor to the housing and vice versa. The vibration should not take place in the anti-friction bearing itself, so that the service life of the bearing increases. The anti-friction bearing can be formed advantageously as grooved ball bearing. This means that ball-shaped rolling bodies circulate in a groove provided on the inner surface of the outer ring. A corresponding groove is provided on the outer surface of the inner ring. Both grooves insure that the balls are secured with a minimum play in both axial directions. Therefore, the ball bearing can be loaded in both axial directions. The possibility of application of a load in both axial directions, together with the use of the permanent magnetic bearing, is very advantageous because such combination insures that at a small deviation of the rotor, an additional force is generated in the direction of the deviation. The deviation, dependent on an installation position and operational conditions, can take place in both axial directions.

Figure 3:
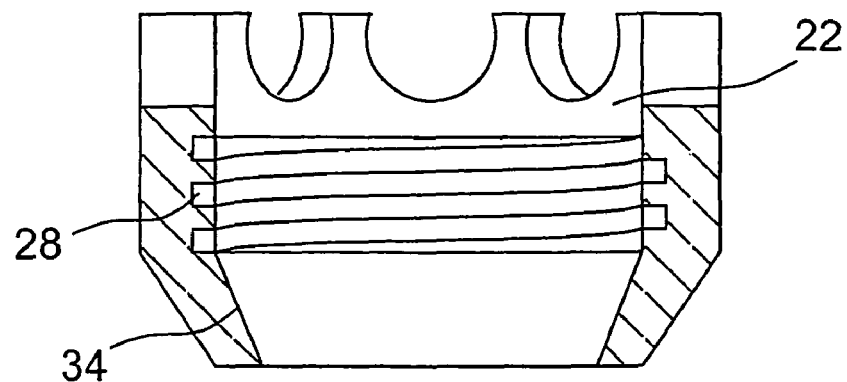
FIG. 3a a cross-sectional view of the cage of the bearing arrangement with a one-flight thread of the threaded groove.
FIG. 3b a cross-sectional view of the cage of the bearing arrangement with a multi-flight thread of the threaded groove.
Figure 3:
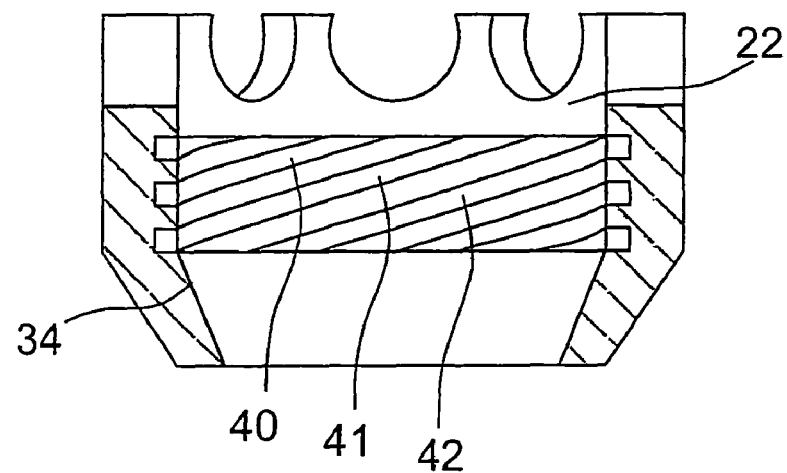

Different possibilities of the shape of the threaded groove 28 are shown in FIGS. 3a and 3b. The cage 22 is shown here with a cone 34. FIG. 3a shows a simplified threaded groove 28 that extends downwardly along the surface of the cage 22. In the region of the groove, formation of a lubricant film is observed. The lubricant film prevents a direct contact between the cage 22 and the inner ring 20. In FIG. 3b, several grooves 40, 41, 42 are provided, so that a multi-start thread is formed. The cross-section and depth of the grooves can be adapted to the amount and the properties of the lubricant film.

According to a modification, the material of the anti-friction bearing includes nitrogen-alloyed martensite steel. Anti-friction bearings with this material component, in particular in a region of the bearing rail, prove themselves very wear-resistant and corrosion-resistant, whereby the service life of the bearing increases further.

Figure 4:
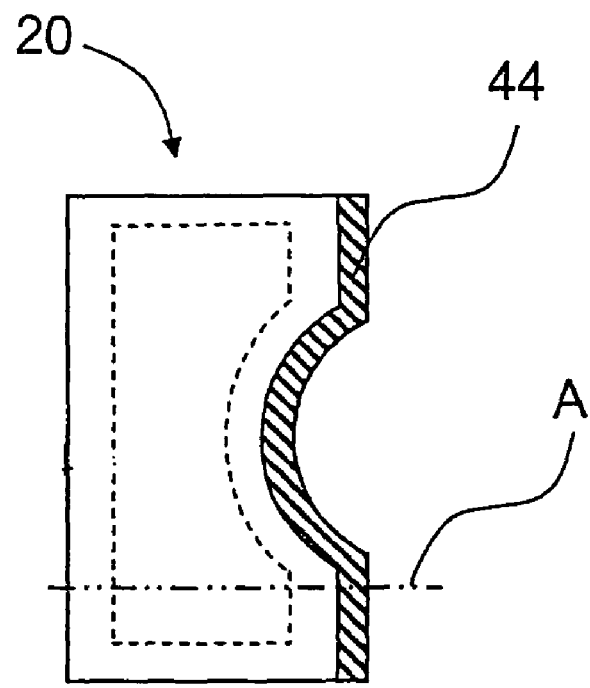
Figure 4:
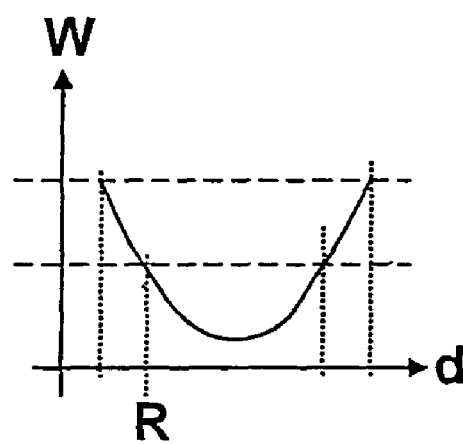

Further developments in selection of material are explained by FIGS. 4a and 4b. FIG. 4a shows a cross-section of the inner ring 20 of the bearing. A closed dash line limits the edge layer from outside of the inner ring 20. The edge layer borders the surface or includes the same. The dash-dot line A indicates a location where the profile shown in FIG. 4b is taken. The profile, which is shown in FIG. 4b, indicates a weight content W of nitrogen along the depth d. The nitrogen content is particularly high in the edge layer and becomes reduced toward the interior at a depth R that defines an end of the edge layer where the nitrogen content has a value of about 0.35% by weight. This depth R lies advantageously in a range of few tenth of mm. The nitrogen content improves surface hardness and corrosion resistance. When the nitrogen content is high only in the edge layer, an economical basic steel can be used. Its nitrogen content, in particular in the vicinity of its surface, is increased by heat treatment in a nitrogen atmosphere. The surface of the anti-friction bearing can have, in addition to the treated layer, a coating layer 44. It can be provided in particular on the inner surface of the outer ring. This layer can have an increased hardness or lubricating characteristics. The lubricating layer can, e.g., contain molybdenumdisulphide.

The above-described material selection and coating can be used for both the inner and outer rings or only for one of the inner and outer rings. Advantageously, at least one ring is formed in accordance with FIG. 4a the ring that rotates with a greater speed, as it is this ring that is loaded at most. In the above-described vacuum pump, this is the inner ring of the bearing.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A vacuum pump, comprising a high-speed rotor; and an anti-friction bearing for rotatably supporting the rotor, the bearing including an inner ring, an outer ring, a rolling body, and a cage for the rolling body, both the rolling body and the cage being located in an intermediate space defined by the outer ring and inner ring, the cage having a threaded groove in a section of a surface of the cage adjacent to the inner ring for insuring a continuous feeding of a lubricant to the bearing; wherein the surface section with the threaded groove extends substantially parallel to the inner ring, and the cage has a conical structure, an inner surface of the conical structure adjoining the surface section of the cage with the threaded groove.

2. A vacuum pump according to claim 1, wherein the anti-friction bearing is formed as a grooved ball bearing.

3. A vacuum pump according to claim 1, wherein the thread of the threaded groove is a multi-start thread.

4. A vacuum pump according to claim 1, comprising a first flange disc that is arranged at an end side of the outer ring remote from the threaded groove.

5. A vacuum pump according to claim 4, comprising a second flange disc that is arranged at an end side of the outer ring adjacent to the threaded groove.

6. A vacuum pump according to claim 5, wherein one of the first and second flange discs is formed as one piece with the outer ring.

7. A vacuum pump according to claim 1, wherein a material of the anti-friction bearing includes nitrogen-alloyed martensite steel.

8. A vacuum pump according to claim 1, wherein a material of the anti-friction bearing includes nitrogen-alloyed martensite steel in an edge layer that borders the surface of the inner ring.

9. A vacuum pump according to claim 1, wherein lubricant is fed to the bearing along the inner surface of the conical structure.

* * * * *